United States Patent Office 3,301,622
Patented Jan. 31, 1967

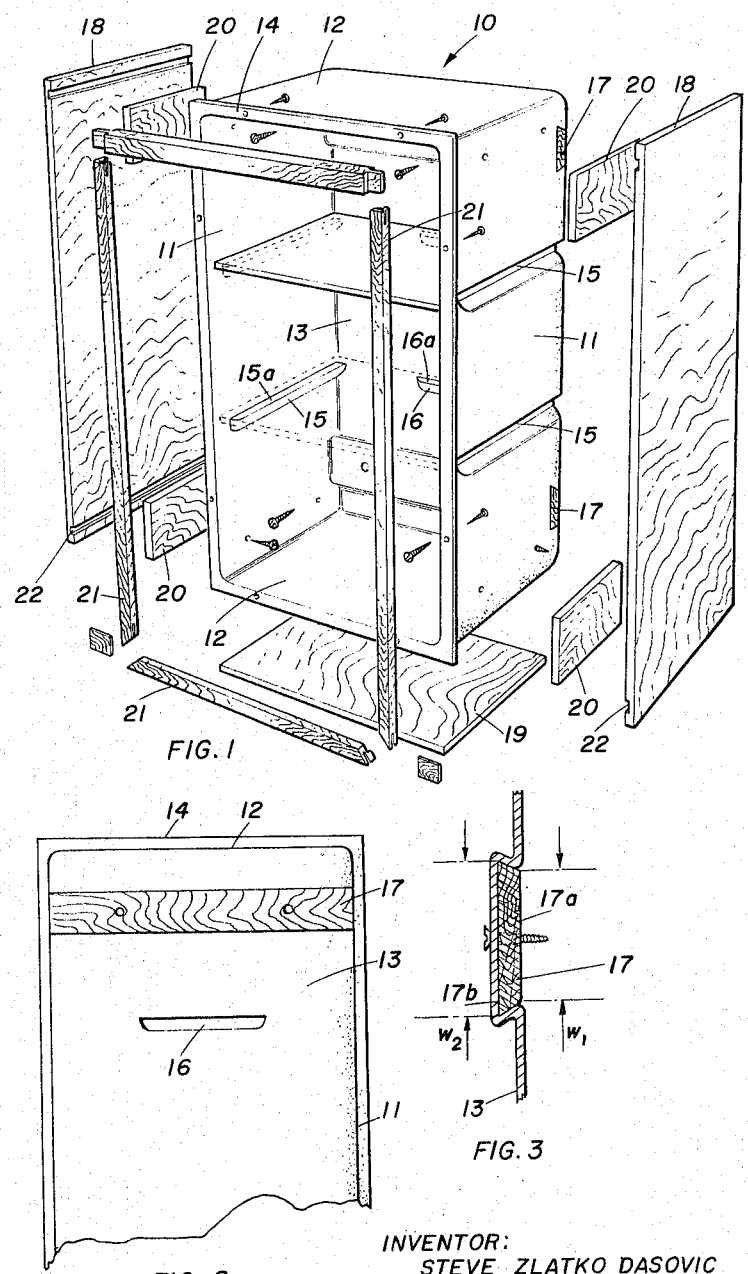

3,301,622
PLASTIC CABINET
Steve Zlatko Dasovic, 37 Brightside Drive, and Hans-Gunther Richard Wolf, 8 Du Barry Ave., both of West Hill, Ontario, Canada
Filed July 9, 1965, Ser. No. 470,714
3 Claims. (Cl. 312—245)

The invention relates to a cupboard or cabinet formed of thermoplastic material.

Modern building techniques as adopted in apartment and domestic building demand increasingly for standardized equipment so as to reduce building costs to a minimum. For many years it has been the practice of builders to purchase cupboards and the like for fitting out kitchens or other rooms, from manufacturers of cupboards, rather than have such cupboards built by individual carpenters in the dwellings. This practice has lead to great economies but such mass produced cupboards have still suffered from many of the disadvantages attendant upon wooden construction. Thus, for example, individual pieces of wood have to be cut and joined and wooden surfaces must be finished and then painted, and, in many cases such mass production techniques have lead to a lowering in the quality of the finished product.

It is apparent that many of these disadvantages can be overcome by the use of thermoplastic material in place of wood and by forming such cupboards of one piece construction. However, such cupboards are intended to store very considerable weights of crockery, glasses and canned foods and other materials and it is hitherto not been possible to produce a satisfactory one-piece plastic cupboard strong enough for the purpose and at a price competitive with that of wooden cupboards.

Accordingly, it is an object of the present invention to provide a plastic cupboard or cabinet which is cheap and economical to build which is rugged and reliable in use and which presents a pleasing finished appearance.

More particularly, it is an objective of the present invention to provide a cupboard or cabinet having the foregoing advantages in which the interior of the cabinet at least is formed of one piece thermoplastic molded construction.

More particularly, it is an objective of the present invention to provide a cupboard or cabinet having the foregoing advantages in which means are provided in the plastic portion of the cabinet for supporting the same directly to the fabric of a building or dwelling.

More particularly, it is an objective of the present invention to provide a cupboard or cabinet having the foregoing advantages in which a single piece of molded thermoplastic material defining the cupboard cavity is combined with a relatively small number of wooden sections to provide an exterior appearance of a well finished wooden cabinet with a one-piece plastic interior.

More particularly, it is an objective of the present invention to provide a cupboard or cabinet having the foregoing advantages which is particularly designed and suitable for assembling together in groups of cupboards side by side with one another.

The foregoing and other advantages will become apparent from the following description of a preferred embodiment of the invention with reference to the following drawings in which like reference devices refer to like parts thereof throughout the various views and diagrams, and in which:

FIGURE 1 is an exploded perspective view of a cupboard according to the invention;

FIGURE 2 is a section along the line 2—2 of FIGURE 1;

FIGURE 3 is a greatly enlarged section of a detail along the line 3—3 of FIGURE 1;

Figure 4:
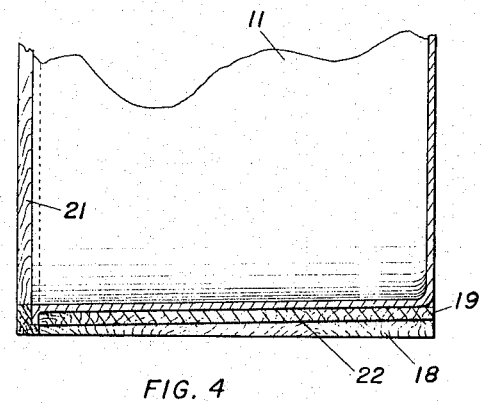
FIGURE 4 is a section along the line 4—4 of FIGURE 1.
Figure 5:
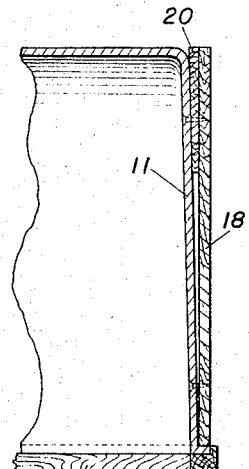
FIGURE 5 is a section along the line 5—5 of FIGURE 1.

Turning now to FIGURE 1 it will be seen that the cupboard according to the invention comprises a generally rectangularly shaped one piece thermoplastic cupboard member indicated generally as 10 having side walls 11 and top and bottom walls 12 and a back wall 13. An outwardly directed flange or fillet 14 is provided around the open side of member 10 for purposes to be described hereinafter. Side walls 11 are provided with parallel indented supporting ribs 15 extending substantially along their length for supporting suitable removable shelf panels of wood or other suitable construction (not shown), and back wall 13 is provided with indented supporting abutments 16 for like purposes, the upwardly directed surfaces 15a and 16a of members 15 and 16 being all located in a common horizontal plane for providing adequate support over a wide area and for spreading the load on any one such shelf over a large area of plastic material.

Back wall 13 is further provided with horizontally extending wooden supporting panels 17 of a generally wedge-shaped cross-section defining an outwardly directed contact surface 17a having a width dimension $w1$ which is less than that of the inwardly directed surface 17b indicated as $w2$. Wedge-shaped member 17 is dimensioned to extend across substantially the fully width of back portion 13 and is retained therein by molding of the thermoplastic material to provide wings 13a fitting around members 17 and retain the same therein due to the wedge-shaped configuration aforesaid. Member 17 is preferably dimensioned so as to provide its outwardly directed surface 17a not quite flush with the outer surface of back portion 13, but slightly recessed relative thereto (see FIGURE 3) for purposes to be described hereinafter.

Wooden cover panels 18 are preferably provided for enclosing side walls 11 of member 10 and a lower wooden cover panel 19 is provided for contacting and supporting bottom wall 12 of member 10 and enclosing the same so as to provide an exterior appearance of finished wood. It will be noted that member 10 is preferably constructed with walls 11 and 12 tapering inwardly from front to back so as to provide a slight "draft" in member 10 for ease of removing the same from a mold, and in order to accommodate this, wooden packing pieces 20 are provided between side members 18 and walls 11 to locate members 18 in parallel planes and in rectangular box-like arrangement, fastened by wood screws as required. A front frame of wood is provided formed of wooden lengths or beading members 21 having a grooved shape in section for fitting around flange 14 and concealing the edges thereof whereby to present the appearance of a finished wooden frame and to conceal the plastic construction. Members 21 are preferably glued or fastened together at the corners and fastened to flange 14 by screws passed through flange 14 forwardly into members 21.

Grooves 22 are provided in side members 18 for edgewise reception of panel 19 therein providing continuous support therefor on each side thereof. It will be noted that grooves 22 are preferably angled at substantially the same inclination as top and bottom walls 12 and located to support panel 19 in overall surface contact with bottom wall 12 for maximum support. Two sets of grooves 22 are provided, at respective edges of panels 18 for interchangeability in assembly.

Doors 23 may be attached by any suitable hardware such as hinges 24 and latches or magnetic fasteners 25

Figure 6:
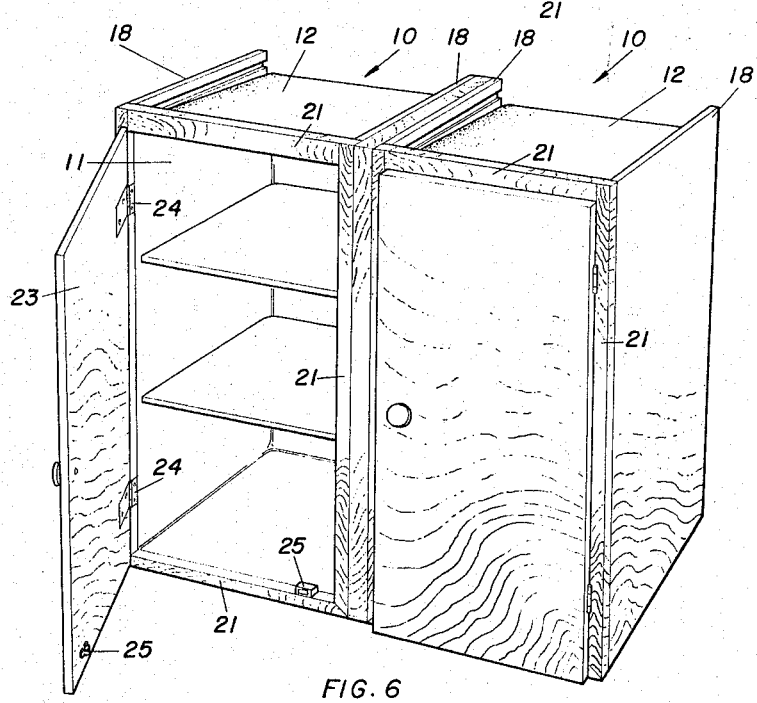
FIGURE 6 is a reduced perspective illustration of a group of cupboards according to FIGURE 1 assembled together and having cupboard doors attached thereto.

(see FIGURE 6) may be attached to frames 21 to complete the cupboards.

It will be noted that when assembled the cupboard has an exterior appearance of wood, all plastic being enclosed and concealed, and the interior is of smooth one-piece plastic construction.

In addition the shelf surfaces in the interior of the cupboard are solidly supported and are capable of carrying substantial loads without damage to the plastic fabric. It will be understood to those skilled in the art that the thermoplastic material employed may preferably be sheet polyethylene of a thickness of between about 1 to 3 tenths of an inch for an average kitchen cupboard or cabinet although the range will of course depend upon the size and use of the cupboard and the nature of the material and its inherent strength.

For attachment to a wall or other surface in a room or building wood screws are passed through back wall 13 and panels 17 (see FIGURE 3) and into such wall and screwed home firmly.

The hole provided in wall 13 for such screws are preferable somewhat oversize in relation to the screws to permit some relative movement without damage to the plastic material. Tightening of such screws will draw panels 17 towards the wall or building thereby tending to draw panels 17 out of engagement with wall 13 molded therearound, wedging the molded portions or wings 13a thereof apart, such wedging action being limited by contact of outer surfaces 17a of panels 17 with such wall or building. This action will cause the entire remainder of back wall 13 to remain pressed firmly in contact with the wall or building and restrain any tendency of the same to sag or become loosened. At the same time the stress on the plastic material is extended over a substantial surface area of plastic, which surface area is of unbroken molded construction characterized by an absence of openings, cuts or other local weaknesses or of adhesive bonding thereby producing a fastening means of great strength and durability and of a mechanical nature as opposed to a chemical or adhesive bond.

The foregoing is a description of the preferred embodiment of the invention which is here made by way of example only. The invention is not to be construed as limited to any of the specific features described but comprehends all such variations as come within the spirit and scope of the appended claims.

What we claim is:

1. A plastic cupboard or like article comprising: a one-piece thermoplastic shell member of generally rectangular shape and having one open side; side walls and upper and lower walls of said shell member being angled inwardly to provide draft therein from said open side to the rear wall thereof; wooden under-support means being attached to a lower wall portion of said shell member over substantially the full area thereof; wooden side-support means attached to said side walls along one edge thereof at least; packing means between said side-support member and said shell side walls maintaining said support members parallel with one another and at least one attachment support member fastened to a wall of said shell opposite to said open side and extending in a horizontal plane, and formed of generally flat, bar-shaped stock having side edges tapering towards one another, and portions of said shell member adjacent said support member being molded to fit closely therearound and retain same in position embedded therein.

2. A plastic cupboard or like article comprising: a one-piece thermoplastic shell member of generally rectangular shape and having one open side; flange means formed on said shell around the periphery of and extending outwardly from said open side and having front and back surfaces; shelf abutment support members formed in the walls of said shell extending inwardly thereof; removable shelf members supported in said shell by said abutment means; wooden beading strips fastened to said flange means over said front surfaces concealing the edges thereof; hinges attached to one portion of said beading strips; fasteners attached to another portion of said beading strips; wooden under-support means being attached to a lower wall portion of said shell member over substantially the full area thereof; wooden side-support means attached to said side walls along one edge thereof at least; packing means between said side-support members and said shell side walls maintaining said support members parallel with one another.

3. A plastic cupboard or like article comprising: a one-piece thermoplastic shell member of generally rectangular shape and having one open side; flange means formed on said shell around the periphery of and extending outwardly from said open side; shelf abutment support members formed in the walls of said shell extending inwardly thereof; at least one attachment support member fastened to a wall of said shell opposite to said open side and extending in a horizontal plane, and formed of generally flat, bar-shaped stock having side edges tapering towards one another; portions of said shell member adjacent said support member being molded to fit closely therearound and retain same in position embedded therein; side walls and upper and lower walls of said shell member being angled inwardly to provide draft therein from said open side to the rear wall thereof; wooden under-support means being attached to a lower wall portion of said shell member over substantially the full area thereof; wooden side-support means attached to said side walls along one edge thereof at least; packing means between said side-support members and said shell side walls maintaining said support members parallel with one another; and wooden beading strips fastened to said flange means concealing the edges thereof.

References Cited by the Examiner

UNITED STATES PATENTS

| 742,012 | 10/1903 | Decker | 312—242 |
| 1,629,430 | 6/1927 | Allen | 312—245 |
| 1,707,013 | 3/1929 | Hoegger | 312—242 |
| 2,439,664 | 4/1948 | Marchand | 312—242 |
| 2,708,147 | 5/1955 | Duggan | 312—111 |
| 2,823,972 | 2/1958 | Saunders | 312—311 |
| 2,907,618 | 10/1959 | Rostau | 312—270 |
| 3,004,815 | 10/1961 | O'Kain | 312—242 |
| 3,085,844 | 4/1963 | Mancini | 312—278 |

FOREIGN PATENTS 362,573 7/1962 Switzerland.

CLAUDE A. LE ROY, *Primary Examiner.*

CHANCELLOR E. HARRIS, *Examiner.*